United States Patent
Lee et al.

(10) Patent No.: US 10,619,729 B2
(45) Date of Patent: Apr. 14, 2020

(54) METHOD OF CONTROLLING SHIFTING TIME IN FULL THROTTLE STATE AND TRANSMISSION CONTROLLED BY METHOD

(71) Applicant: HYUNDAI AUTRON CO., LTD., Seoul (KR)

(72) Inventors: Johnha Lee, Suwon-si (KR); Sungwook Jung, Seongnam-si (KR); Sehoon Son, Suwon-si (KR)

(73) Assignee: Hyundai Autron Co., Ltd., Seoul (KR)

( * ) Notice: Subject to any disclaimer, the term of this patent is extended or adjusted under 35 U.S.C. 154(b) by 7 days.

(21) Appl. No.: 16/193,705

(22) Filed: Nov. 16, 2018

(65) Prior Publication Data
US 2019/0162297 A1    May 30, 2019

(30) Foreign Application Priority Data
Nov. 27, 2017 (KR) .......................... 10-2017-0159497

(51) Int. Cl.
*F16H 61/02* (2006.01)
*F16H 59/24* (2006.01)
(Continued)

(52) U.S. Cl.
CPC ......... *F16H 61/0213* (2013.01); *F16H 59/24* (2013.01); *F16H 59/36* (2013.01);
(Continued)

(58) Field of Classification Search
USPC .......................................................... 701/55
See application file for complete search history.

(56) References Cited

U.S. PATENT DOCUMENTS 4,943,921 A * 7/1990 Baltusis .............. F16H 61/0213
477/143
5,020,622 A * 6/1991 Hrovat .................. B60K 28/165
180/197
(Continued)

FOREIGN PATENT DOCUMENTS

JP          11210874 A    8/1999
KR       19970046598 A   10/2000
(Continued)

*Primary Examiner* — Dirk Wright
(74) *Attorney, Agent, or Firm* — Baker & Hostetler LLP; Hyunho Park

(57) ABSTRACT

Disclosed is a method of controlling a shifting time and a transmission controlled by the method. A method of controlling a shifting time of an automatic transmission mounted on a vehicle to control the driving of the transmission by incorporating the state of an engine includes an entry condition determination step of determining whether the engine of the vehicle being driven is a full throttle driving state and a shifting point correction logic entry condition is satisfied, an engine speed calculation step of calculating an expected maximum engine speed during gear shifting, and a shifting time delay step of delaying a shifting time during a specific time if an expected maximum engine speed value calculated in the engine speed calculation step is less than a preset value. Accordingly, a shifting pattern into which maximum acceleration performance set through maximum performance of an engine has been incorporated can be implemented.

14 Claims, 4 Drawing Sheets

(51) Int. Cl.
    *F16H 59/48*     (2006.01)
    *F16H 59/36*     (2006.01)
    *F16H 59/78*     (2006.01)

(52) U.S. Cl.
    CPC .............. *F16H 59/48* (2013.01); *F16H 59/78* (2013.01); *F16H 2059/363* (2013.01); *F16H 2059/366* (2013.01); *F16H 2061/0223* (2013.01); *F16H 2306/20* (2013.01)

(56) References Cited

U.S. PATENT DOCUMENTS

| | | | | |
|---|---|---|---|---|
| 5,053,963 | A * | 10/1991 | Mack | B60K 31/047 |
| | | | | 180/170 |
| 5,092,434 | A * | 3/1992 | Smith | F16H 37/0846 |
| | | | | 477/39 |
| 6,123,644 | A * | 9/2000 | Janecke | F16H 61/10 |
| | | | | 477/120 |
| 6,684,144 | B2 * | 1/2004 | Sekii | F16H 61/0213 |
| | | | | 701/51 |
| 7,578,766 | B2 * | 8/2009 | Watanabe | F16H 61/0213 |
| | | | | 477/107 |
| 9,739,370 | B2 * | 8/2017 | Yang | F16H 61/0213 |
| 10,234,031 | B2 * | 3/2019 | Leehaug | B60W 10/06 |

FOREIGN PATENT DOCUMENTS

| | | |
|---|---|---|
| KR | 20-2001-0004231 A | 9/2001 |
| KR | 20020044465 A | 6/2002 |
| KR | 20090018412 A | 2/2009 |
| KR | 10-2009-0019867 A | 9/2010 |
| KR | 10-1713752 B1 | 3/2017 |

\* cited by examiner

METHOD OF CONTROLLING SHIFTING TIME IN FULL THROTTLE STATE AND TRANSMISSION CONTROLLED BY METHOD

CROSS REFERENCE TO RELATED APPLICATION

The present application claims the benefit of Korean Patent Application No. 10-2017-0159497 filed in the Korean Intellectual Property Office on Nov. 27, 2017, the entire contents of which are incorporated herein by reference.

BACKGROUND OF THE INVENTION

1. Technical Field

The present invention relates to a method of controlling a shifting time and a transmission controlled by the method and, more particularly, to a shift time control method of controlling the driving of a transmission by incorporating the state of ah engine in a full throttle state and a transmission controlled by the method.

2. Description of the Related Art

In general, the shifting time of an automatic transmission for a vehicle is determined by a T.P.S sensor for detecting the degree of opening of a throttle valve according to an accelerator manipulation of a driver and an O.P.S sensor for detecting the RPM of an output shaft of the automatic transmission.

That is, as shown in FIG. 1, in an automatic transmission according to a conventional technology, the signal of a T.P.S (i.e., the degree of opening of a throttle valve) sensor S3 and the signal of an O.P.S (i.e, the RPM of output shaft of a transmission) sensor S4 are input to a T.C.U processor S7. The T.C.U processor S7 has been programmed to determine the operating time of a shifting unit S8 by calculating the signals.

In the automatic transmission according to a conventional technology, when the driver of a vehicle fully loaded with goods increases the degree of opening of a throttle valve by hard stepping on an accelerator in order to obtain output sufficient to carry the goods, the TCU detects the increased degree of opening of the throttle valve and supplements the insufficient output by slowing down the shifting time in a low gear. However, although the driver of a vehicle not loaded with goods increases the degree of opening of a throttle valve by hard stepping on an accelerator in order to increase the driving speed of the vehicle, the T.C.U determines the increased degree of opening of the throttle valve to be for increasing output although the output is sufficient, and slows down the shifting time of gears, which is counter to the driver's intention. Accordingly, there are disadvantages in that unnecessary fuel is greatly wasted and exhaust excessively occurs.

Furthermore, in a method of controlling a shifting time according to a conventional technology, the shifting time is controlled to implement gear shifting based on a shifting pattern. In this case, the shifting pattern commonly uses vehicle speed and the amount of acceleration as axes. The shifting pattern is determined as a line in which fuel efficiency and mileage have been optimized.

However, the method of controlling a shifting time according to a conventional technology has a problem in that the shifting time cannot be controlled based on timing at which maximum performance of the engine is achieved.

Accordingly, there is a need for a technology a method of controlling a shifting time and a transmission controlled by the method, which can solve the aforementioned conventional problems.

PRIOR ART DOCUMENT

Patent Document (Patent Document 0001) Korean Patent No. 10-1713752 (Mar. 2, 2017)

SUMMARY OF THE INVENTION

Accordingly, an object of the present invention is to provide a method of controlling a shifting time, which can implement a shifting pattern into which maximum acceleration performance set through maximum performance of an engine has been incorporated and a transmission controlled by the method.

A method of controlling a shifting time of an automatic transmission mounted on a vehicle to control the driving of the transmission by incorporating the state of an engine may include a) an entry condition determination step of determining whether the engine of the vehicle being driven is a full throttle driving state and a shifting point correction logic entry condition is satisfied, b) an engine speed calculation step of calculating an expected maximum engine speed during gear shifting, and c) a shifting time delay step of delaying a shifting time during a specific time if an expected maximum engine speed value calculated in the engine speed calculation step is less than a preset value.

In one embodiment of the present invention, in the entry condition determination step, the shifting point correction logic entry condition may include whether CAN communication is normal, whether APS and TPS signals are normal, and whether APS and TPS setting values are exceeded.

Furthermore, in the entry condition determination step, the shifting point correction logic entry condition may include whether engine speed is a preset value or more, whether a switch for each shifting pattern mode is an ON state, whether a switch for each current gear stage is an ON state, whether a position lever is a D stage, and whether an upshifting request according to a shifting pattern is present.

In one embodiment of the present invention, in the engine speed calculation step, the expected maximum engine speed may be a value calculated by adding the product of an acceleration value of a current engine speed and an expected gear shifting preparation time to the current engine speed.

In this case, the expected gear shifting preparation time may be a value calculated based on a preset time and a set table value.

Furthermore, the value based on the set table value may be a value determined and calculated based on a temperature of engine oil, a shifting pattern mode, and an acceleration value of a current engine speed.

Furthermore, the expected gear shifting preparation time may be a value calculated based on a trained time value and a set table value.

In this case, the trained time value may be a value calculated by adding an expected gear shifting preparation time addition and subtraction value, obtained from a previous shifting pattern, to the first set time.

In one embodiment of the present invention, the method may further include d) a shifting execution step of immediately performing gear shifting when the expected maximum engine speed value obtained in the engine speed calculation step is the preset value or more.

In this case, the method may further include e) a training entry condition determination the step of determining whether a preset time has elapsed after previous gear shifting is terminated and performing the entry condition determination step if the preset time has elapsed.

In one embodiment of the present invention, the training entry condition determination step may further include determining whether CAN communication is normal, whether APS and TPS signals are normal, and a temperature value of engine oil is a value within a preset range.

In one embodiment of the present invention, the method may further include e) a training axis calculation step of calculating a difference between a maximum engine speed value detected during gear shifting and a preset shifting reference engine speed value right after gear shifting is performed.

In this case, the method may further include f) a training execution step of changing a shifting reference engine speed value by adding the difference between the engine speed values, calculated in the training axis calculation step, to a preset shifting reference engine speed value.

Furthermore, an embodiment of the present invention may provide an automatic transmission for a vehicle, which is controlled by the method of controlling a shifting time.

DESCRIPTION OF REFERENCE NUMERALS

100: transmission controller
110: condition confirmation unit
120: shifting time controller
130: shifting time training unit
S100: method of controlling shifting time
S110: entry condition determination step
S120: engine speed calculation step
S130: shifting time delay step
S140: shifting execution step
S150: training entry condition determination step
S160: training axis calculation step
S170: training execution step

DETAILED DESCRIPTION

Hereinafter, embodiments of the present invention are described in detail with reference to the accompanying drawings. Terms or words used in the specification and claims should not be construed as having common or dictionary meanings, but should be construed as having meanings and concepts that comply with the technological spirit of the present invention.

In the entire specification, when it is described that one member is placed "on or over" the other member, it means that one member may adjoin the other member and a third member may be interposed between the two members. In the entire specification, unless explicitly described to the contrary, the word "include, have, or comprise" will be understood to imply the inclusion of stated elements but not the exclusion of any other elements.

Figure 1:
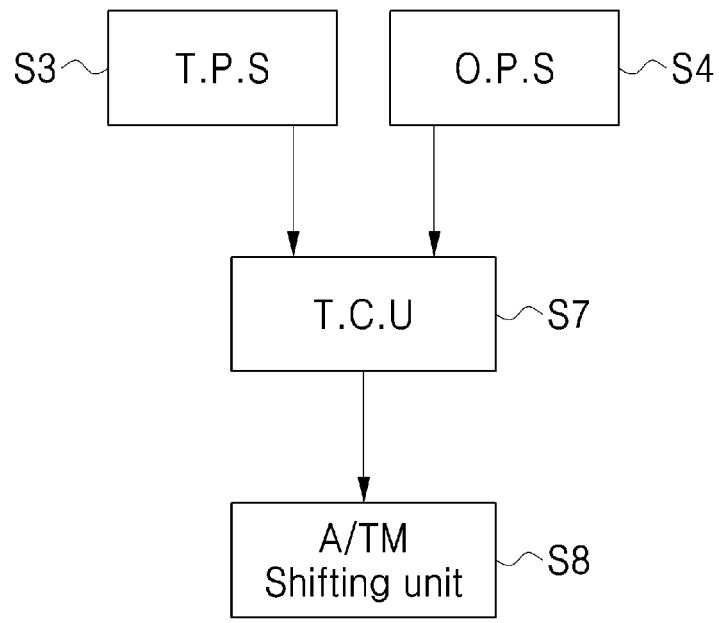
FIG. 1 is a flowchart showing a method of controlling the gear shifting of a vehicle according to a conventional technology.
Figure 2:
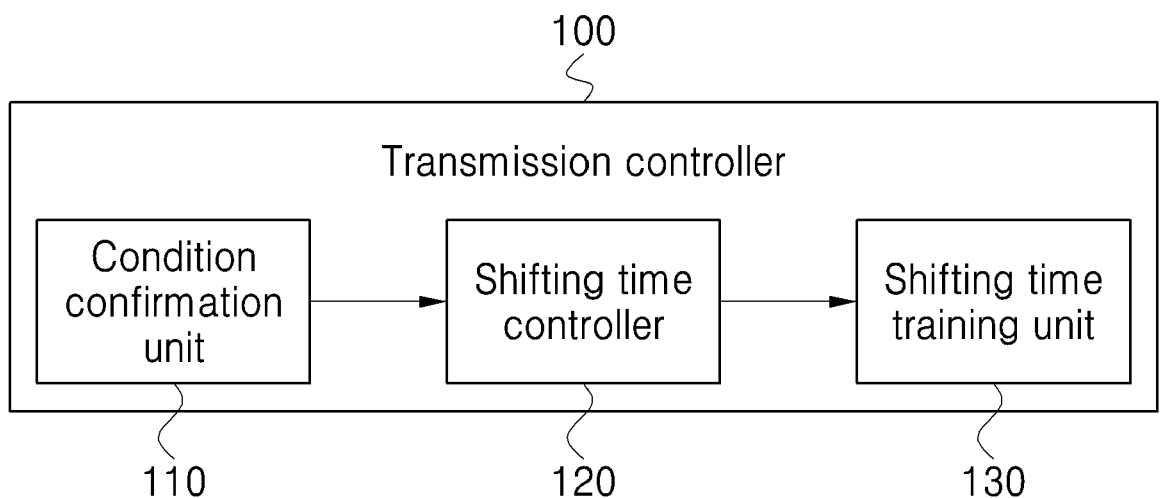
FIG. 2 shows the configuration of an automatic transmission for a vehicle according to an embodiment of the present invention.
Figure 3:
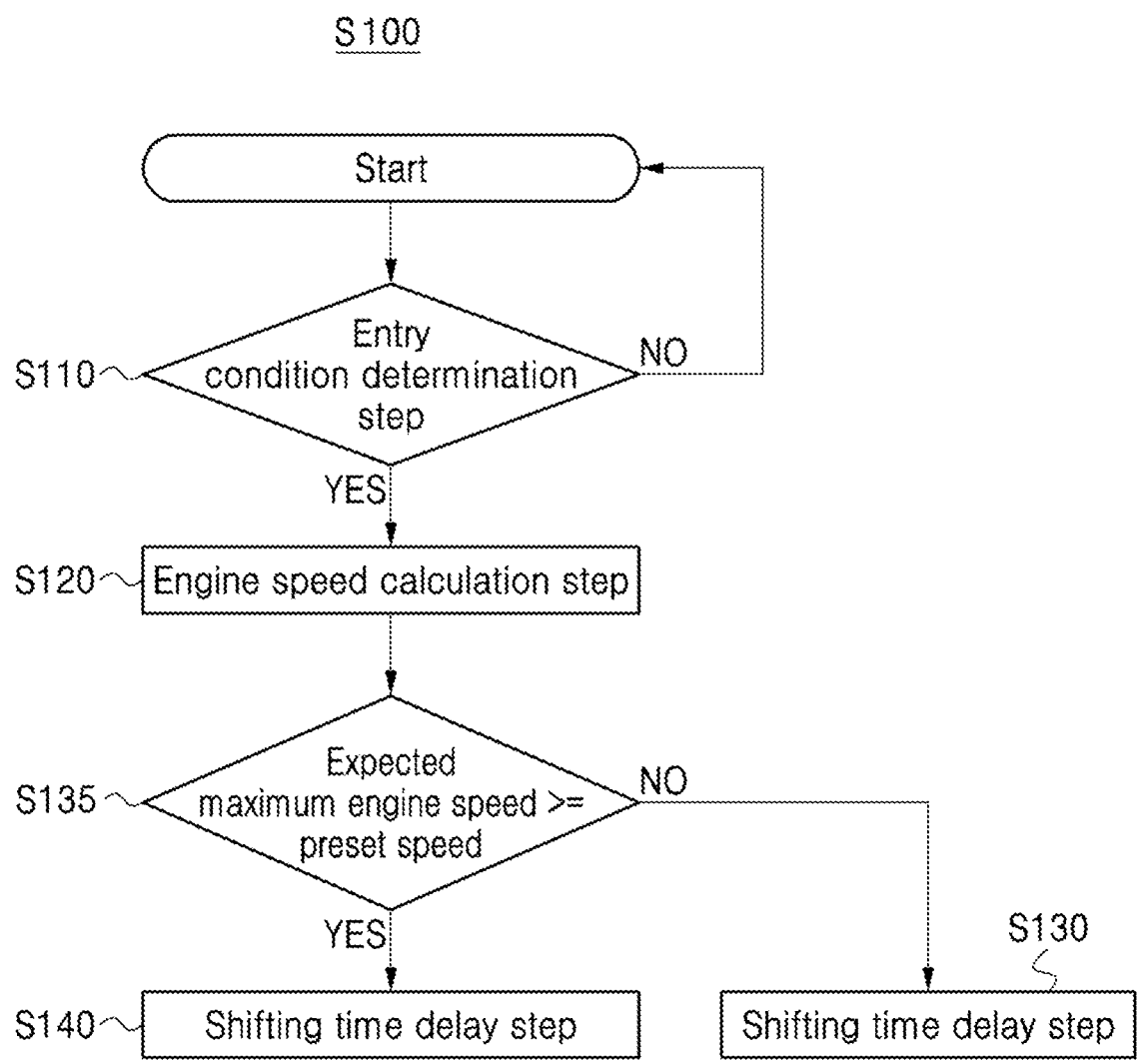
FIG. 3 is a flowchart showing a method of controlling a shifting time according to an embodiment of the present invention.

FIG. 2 shows the configuration of an automatic transmission for a vehicle according to an embodiment of the present invention. FIG. 3 is a flowchart showing a method of controlling a shifting time according to an embodiment of the present invention.

Referring to FIGS. 2 and 3, the method S100 of controlling a shifting time according to the present embodiment is a method of controlling the shifting time of an automatic transmission mounted on a vehicle to control the driving of the transmission by incorporating the state of an engine. The method includes an entry condition determination step S110, an engine speed calculation step S120 and a shifting time delay step S130 including specific elements. Accordingly, there can be provided a method of controlling a shifting time, which can implement a shifting pattern into which maximum acceleration performance set through maximum performance of the engine has been incorporated.

The steps of the method S100 of controlling a shifting time according to the present embodiment are described in detail with reference to the accompanying drawings.

An automatic transmission controller 100 for a vehicle, which can implement the method of controlling a shifting time according to the present embodiment, may be an element including a condition confirmation unit 110, a shifting time controller 120 and a shifting time training unit 130, as shown in FIG. 2.

Specifically, as shown in FIG. 3, the condition confirmation unit 110 is an element configured to perform the entry condition determination step S110. The condition confirmation unit 110 may determine when the engine of a vehicle being driven is a full throttle driving state and a shifting point correction logic entry condition is satisfied.

In this case, the condition confirmation unit 110 may calculate an expected maximum engine speed during gear shifting through the engine speed calculation step S120.

Thereafter, when an expected maximum engine speed value calculated in the engine speed calculation step S120 is less than a preset value, the shifting time controller 120 may perform the shifting time delay step S130 of delaying a shifting time during a specific time.

Furthermore, when an expected maximum engine speed value calculated in the engine speed calculation step is equal to or greater than the preset value, the shifting time controller 120 may perform a shifting execution step S140 of immediately performing gear shifting.

As shown in FIG. 3, the entry condition determination step S110 forming the method S100 of controlling a shifting time according to the present embodiment is performed based on the shifting point correction logic entry condition including a specific condition. The shifting point correction logic entry condition may include whether CAN communication is a normal state, whether APS and TPS signals are normal, and whether APS and TPS setting values are exceeded.

In some embodiments, the shifting point correction logic entry condition may further include whether engine speed is a preset value or more, whether a switch for each shifting pattern mode is an ON state, whether a switch for each current gear stage is an ON state, whether a position lever is a D stage, and whether an upshifting request according to a shifting pattern is present.

In the engine speed calculation step S120, an expected maximum engine speed during gear shifting is calculated. In this case, the expected maximum engine speed may be a value calculated by adding the product of an acceleration value of a current engine speed and an expected gear shifting preparation time to the current engine speed.

In this case, the aforementioned expected gear shifting preparation time is a value calculated based on a preset time and a set table value. A value calculated based on the set table value may be a value determined and calculated based on a temperature of engine oil, a shifting pattern mode, and an acceleration value of a current engine speed.

In some embodiments, the aforementioned expected gear shifting preparation time is a value calculated based on a trained time value and a set table value. In this case, the trained time value may be a value calculated by adding an expected gear shifting preparation time addition and subtraction value, obtained from a previous shifting pattern, to the first set time.

Accordingly, in accordance with the method S100 of controlling a shifting time according to an embodiment of the present invention, more accurate maximum performance timing of the engine can be calculated by calculating an expected maximum engine speed based on a value calculated by adding the product an acceleration value of a current engine speed and an expected gear shifting preparation time to the current engine speed and calculating an expected gear shifting preparation time based on a trained time value and a set table value. As a result, there can be provided a method of controlling a shifting time, which can implement a shifting pattern into which maximum acceleration performance set through maximum performance of an engine has been incorporated.

Figure 4:
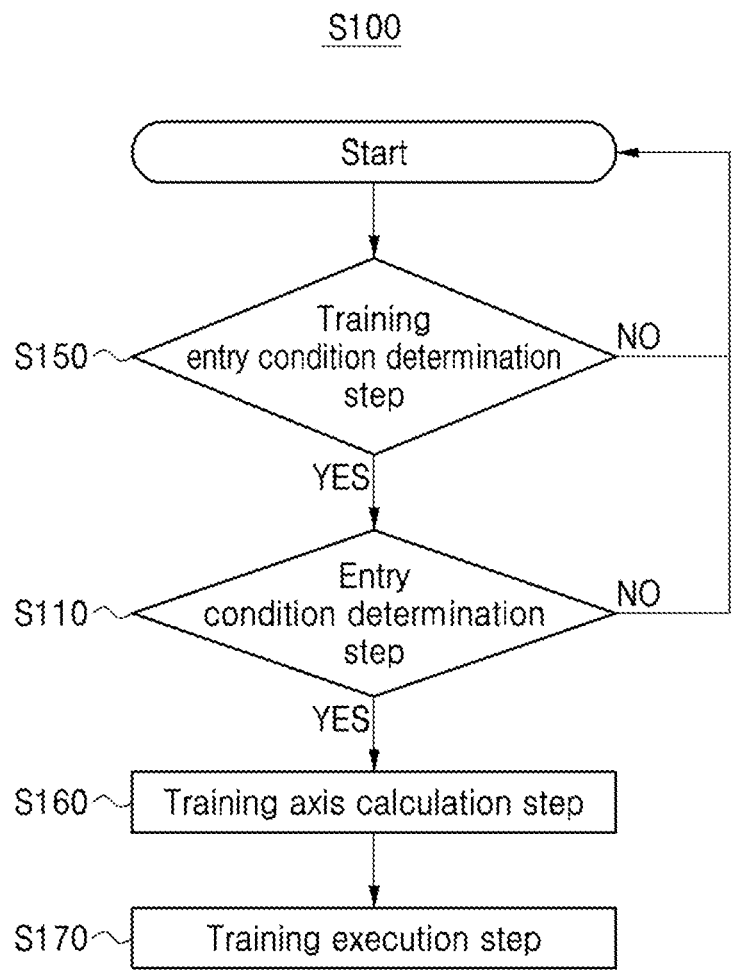
FIG. 4 is a flowchart showing a method of controlling a shifting time according to an embodiment of the present invention.

As shown in FIGS. 2 and 4 the transmission controller 100 according to the present embodiment may be an element further including the shifting time training unit 130 configured to perform a training entry condition determination step S150 of determining whether a preset time has elapsed after previous gear shifting is terminated and performing the entry condition determination step S110 if the preset time has elapsed.

The training entry condition determination step S150 may include further determining whether CAN communication is normal, whether APS and TPS signals are normal, and a temperature value of engine oil is a value within a preset range.

Specifically, as shown in FIGS. 2 and 4, the shifting time training unit 130 may perform a training axis calculation step S160 of calculating a difference between the maximum engine speed value detected during gear shifting and the preset shifting reference engine speed value right after gear shifting is performed. Thereafter, the shifting time training unit 130 may change a shifting reference engine speed value by adding the difference between the engine speed values obtained in the training axis calculation step S160 to a preset shifting reference engine speed value.

Figure 5:
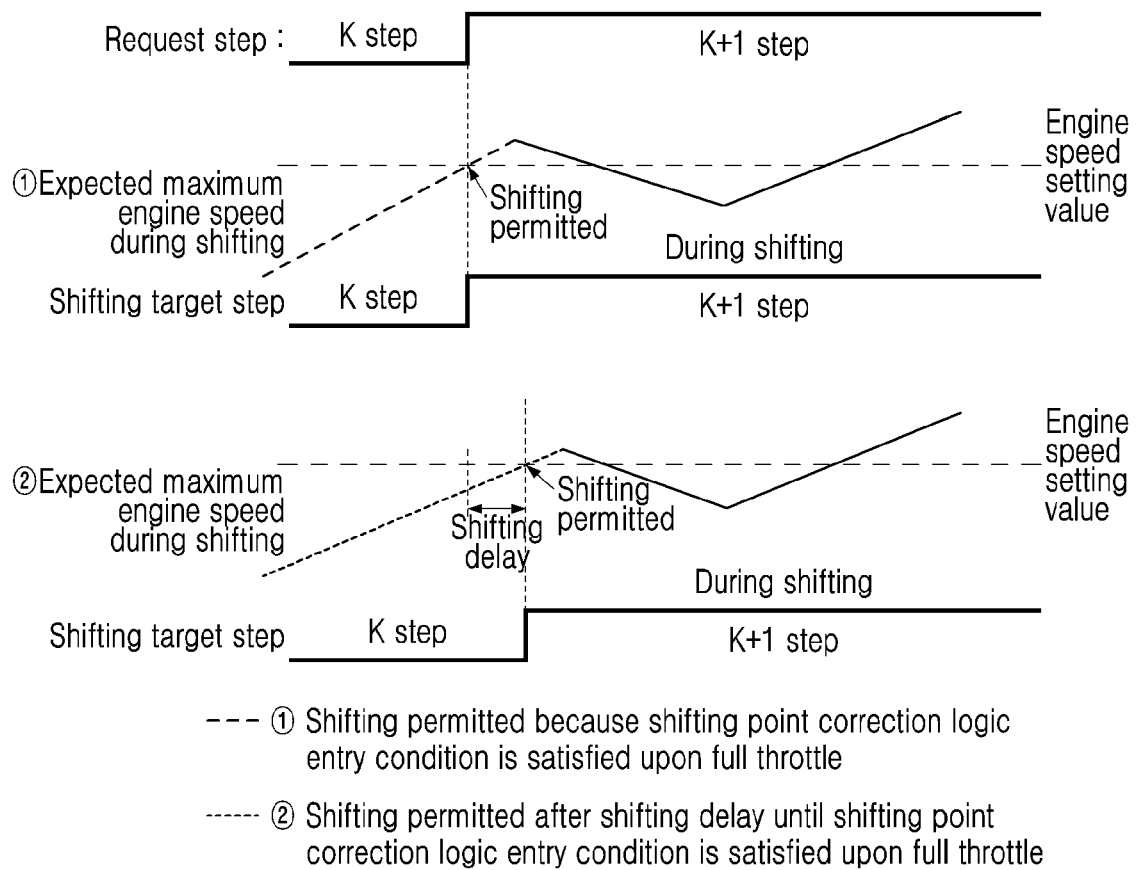
FIG. 5 is a graph showing logic for the method of controlling a shifting time according to an embodiment of the present invention.

As a result, as shown in FIG. 5, the method S100 of controlling a shifting time according to an embodiment of the present invention includes the training entry condition determination step S150 of determining whether a preset time has elapsed after previous gear shifting is terminated and performing the entry condition determination step S110 if the preset time has elapsed and the training axis calculation step S160 of calculating a difference between a maximum engine speed value detected during gear shifting and a preset shifting reference engine speed value right after gear shifting is performed. Accordingly, more accurate maximum performance timing of the engine can be calculated by incorporating the current state and condition of the engine in real time. As a result, there can be provided a method of controlling a shifting time, which can implement a shifting pattern into which maximum acceleration performance set through maximum performance of an engine has been incorporated.

As described above, the method of controlling a shifting time according to an embodiment of the present invention can provide a method of controlling a shifting time, which can implement a shifting pattern into which maximum acceleration performance set through maximum performance of an engine has been incorporated by including the entry condition determination step, the engine speed calculation step and the shifting time delay step.

Furthermore, in accordance with the method of controlling a shifting time according to an embodiment of the present invention, whether the engine of a vehicle being driven is a full throttle driving state and a shifting point correction logic entry condition is satisfied is determined. An expected maximum engine speed during gear shifting is calculated. If the calculated expected maximum engine speed value is less than a preset value, a shifting time is delayed during a specific time. Accordingly, there can be provided a method of controlling the shifting time, which implements a shifting pattern into which maximum acceleration performance set through maximum performance of an engine has been incorporated.

Furthermore, in accordance with the method of controlling a shifting time according to an embodiment of the present invention, the shifting point correction logic entry condition includes whether CAN communication is normal, whether APS and TPS signals are normal, whether APS and TPS setting values are exceeded, whether engine speed is a preset value or more, whether a switch for each shifting pattern mode is an ON state, whether a switch for each current gear stage is an ON state, whether a position lever is a D stage, and whether an upshifting request according to a shifting pattern is present. Accordingly, there can be provide a method of controlling a shifting time, which can implement a shifting pattern into which maximum acceleration performance set through maximum performance of an engine has been incorporated.

Furthermore, in accordance with the method of controlling a shifting time according to an embodiment of the present invention, an expected maximum engine speed is calculated based a value calculated by adding the product of an acceleration value of a current engine speed and an expected gear shifting preparation time to the current engine speed. An expected gear shifting preparation time is calculated based on a trained time value and a set table value. Accordingly, more accurate maximum performance timing of an engine can be calculated. As a result, there can be provided a method of controlling a shifting time, which can implement a shifting pattern into which maximum acceleration performance set through maximum performance of an engine has been incorporated.

Furthermore, the method of controlling a shifting time according to an embodiment of the present invention includes the training entry condition determination step of determining whether a preset time has elapsed after previous gear shifting is terminated and performing the entry condition determination step if the preset time has elapsed and the training axis calculation step of calculating a difference between a maximum engine speed value detected during gear shifting and a preset shifting reference engine speed value right after gear shifting is performed. Accordingly, more accurate maximum performance timing of an engine can be calculated by incorporating the current state and condition of the engine in real time. As a result, there can be provided a method of controlling a shifting time, which can implement a shifting pattern into which maximum acceleration performance set through maximum performance of an engine has been incorporated.

Furthermore, the automatic transmission for a vehicle according to an embodiment of the present invention is controlled by the method of controlling a shifting time including specific steps. Accordingly, there can be provided an automatic transmission for a vehicle, which can implement a shifting pattern into which maximum acceleration performance set through maximum performance of an engine has been incorporated.

In the detailed description of the present invention, only some special embodiments of the present invention have been described. It is however to be understood that the present invention is not limited to the special embodiments described in the detailed description, but should be construed as including all of changes, equivalents and substitutes without departing from the spirit and range of right of the present invention defined by the appended claims.

That is, the present invention is not limited to the above-described specific embodiments and description and may be modified in various ways by a person having ordinary skill in the art to which the present invention pertains without departing from the gist of the present invention written in the claims. Such modifications or changes fall in the range of protection of the present invention.

What is claimed is:

1. A method of controlling a shifting time of an automatic transmission mounted on a vehicle to control a driving of the transmission by incorporating a state of an engine, comprising:
   a) an entry condition determination step of determining whether the engine of the vehicle being driven is a full throttle driving state and a shifting point correction logic entry condition is satisfied;
   b) an engine speed calculation step of calculating an expected maximum engine speed during gear shifting; and
   c) a shifting time delay step of delaying a shifting time during a specific time if an expected maximum engine speed value calculated in the engine speed calculation step is less than a preset value.

2. The method of claim 1, wherein in the entry condition determination step, the shifting point correction logic entry condition comprises whether CAN communication is normal, whether APS and TPS signals are normal, and whether APS and TPS setting values are exceeded.

3. The method of claim 1, wherein in the entry condition determination step, the shifting point correction logic entry condition comprises whether engine speed is a preset value or more, whether a switch for each shifting pattern mode is an ON state, whether a switch for each current gear stage is an ON state, whether a position lever is a D stage, and whether an upshifting request according to a shifting pattern is present.

4. The method of claim 1, wherein in the engine speed calculation step, the expected maximum engine speed is a value calculated by adding a product of an acceleration value of a current engine speed and an expected gear shifting preparation time to the current engine speed.

5. The method of claim 4, wherein the expected gear is shifting preparation time is a value calculated based on a preset time and a set table value.

6. The method of claim 5, wherein the value based on the set table value is a value determined and calculated based on a temperature of engine oil, a shifting pattern mode, and an acceleration value of a current engine speed.

7. The method of claim 4, wherein the expected gear shifting preparation time is a value calculated based on a trained time value and a set table value.

8. The method of claim 7, wherein the trained time value is a value calculated by adding an expected gear shifting preparation time addition and subtraction value, obtained from a previous shifting pattern, to a first set time.

9. The method of claim 1, further comprising d) a shifting execution step of immediately performing gear shifting when the expected maximum engine speed value obtained in the engine speed calculation step is the preset value or more.

10. The method of claim 1, further comprising e) a training entry condition determination step of:
    determining whether a preset time has elapsed after previous gear shifting is terminated, and
    performing the entry condition determination step if the preset time has elapsed.

11. The method of claim 10, wherein the training entry condition determination step comprises further determining whether CAN communication is normal, whether APS and TPS signals are normal, and a temperature value of engine oil is a value within a preset range.

12. The method of claim 10, further comprising e) a training axis calculation step of calculating a difference between a maximum engine speed value detected during gear shifting and a preset shifting reference engine speed value right after gear shifting is performed.

13. The method of claim 12, further comprising f) a training execution step of changing a shifting reference engine speed value by adding the difference between the engine speed values, calculated in the training axis calculation step, to a preset shifting reference engine speed value.

14. An automatic transmission for a vehicle, which is controlled by a method of controlling a shifting time according to claim 1.

* * * * *